L. F. GLAUDE.
DRILL PRESS.
APPLICATION FILED SEPT. 24, 1918.
1,317,285.
Patented Sept. 30, 1919.
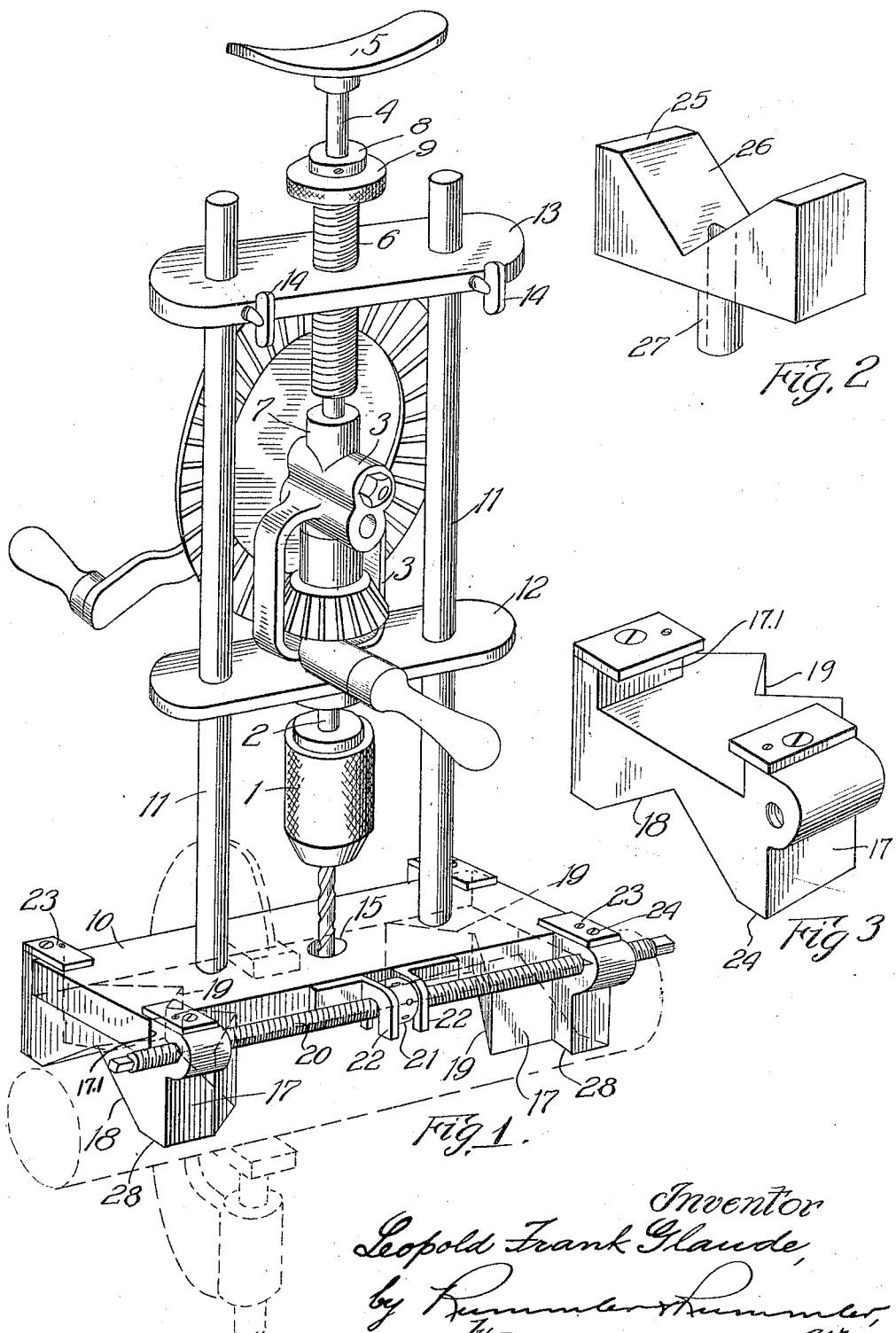

UNITED STATES PATENT OFFICE.

LEOPOLD F. GLAUDE, OF CHICAGO, ILLINOIS.

DRILL-PRESS.

1,317,285.  Specification of Letters Patent.  Patented Sept. 30, 1919.

Application filed September 24, 1918. Serial No. 255,489.

*To all whom it may concern:*

Be it known that I, LEOPOLD F. GLAUDE, a citizen of the United States of America, and a resident of Chicago, county of Cook, and State of Illinois, have invented certain new and useful Improvements in Drill-Presses, of which the following is a specification.

The main objects of this invention are to provide an improved form of drill-press support particularly adapted for use in connection with breast drills whereby the latter may be more conveniently used on work for which the breast drill is not ordinarily suited, such for example as the drilling of holes where it is essential that the hole be drilled accurately both as to location and as to perpendicularity with respect to a surface; to provide improved means whereby a support of this kind may be readily thrown into and out of effective coöperative relation with a feed screw on the drill-press; and to provide improved means for centering the work with respect to the axis of the drill.

A specific embodiment of this invention is illustrated in the accompanying drawings, in which—

Figure 1 is a perspective view of the improved drill-press support as applied to an ordinary breast drill.

Fig. 2 illustrates a different form of work-engaging or centering block suitable for use in connection with the support illustrated in Fig. 1.

Fig. 3 is an enlarged detail of one of the centering blocks shown in Fig. 1.

In the form shown in the drawings, the breast drill is of usual form, comprising a chuck 1 carried by a shaft 2 with operating mechanism therefor all mounted in a frame 3. A stock 4 is rigidly secured to the frame 3 in alinement with the drill shaft and carries a breast pad 5 at its upper end. A tubular feed screw 6 is rotatably mounted on the stock 4 and is confined between a boss 7 on the frame and a collar 8 on the stock. The screw 6 has a knurled head 9 whereby it may be readily turned to raise or lower the drill.

The improved support comprises a base plate 10 to which are rigidly secured a pair of upright bars 11 which serve as guide means for the drill-press and are connected thereto by means of cross-heads 12 and 13. The lower cross-head 12 is rigid on the drill-press frame 3 and may be cast integrally therewith, said cross-head having sliding engagement with the upright bars 11, so as to permit the frame 3 to be longitudinally shifted with respect to said bars. The upper cross-head 13 has threaded connection with the feed screw 6 and may be fixed with regard to the upright guide means 11 by means of set screws 14.

The base plate has an aperture 15 located centrally between the uprights 11 to permit the drill to extend through the base plate for engaging a piece of work below it. For the purpose of enabling the drill-press to be properly supported with respect to a cylindrical piece of work, blocks 17 are provided which have V-shaped work-engaging seats 18 and 19 on their lower edges and on their opposed side faces respectively, and their upper edges are shaped for slidably engaging the base plate as shown in Fig. 1. The blocks 17 are adjustable toward and away from each other by means of the right and left threaded shaft screw 20.

For the purpose of centering the drill-press with respect to the axis of a circular piece of work, the work-engaging seats 19 are used and the blocks 17 are drawn together so as to grip the work between them. This is accomplished by means of the right and left threaded screw 20. Suitable means such as the annular shoulder 21 on the screw and lugs 22 on the base plate insure that a piece of circular work gripped between the blocks 17 will be exactly centered with respect to the drill. Removable flanges 23 are secured to the blocks 17 by screws 24, the inner ends of said flanges extending beyond the shoulders 17.1, so as to slidably engage the top surface of the base plate 10. The shaft screw 20 is of sufficient length to permit the blocks 17 to be removed from the base plate as a unit. The lowermost edges 28 of the blocks 17 are all in the same plane so that the device may stand upright on a flat surface. In practice, I prefer to make the shoulders 17.1 on the blocks 17, which engage the sides of the base plate 10, somewhat broader than they are shown in Fig. 1, so that the blocks will have longer bearing faces and will slide freely under the action of the screw 20. Fig. 1 was drawn slightly out of proportion in this regard in order to more clearly show the shape of the work-engaging surfaces 18 and 19.

A modified form of block especially useful for supporting small rods or other cylindrical pieces of work of small diameter is shown at 25 in Fig. 2, this form of block being adapted to be seated on top of the base plate with its V-shaped seat 26 facing upward and with a stud 27 on its under side for engaging the hole 15 of the base plate.

In operation, the base plate 10 or the work-engaging blocks mounted thereon are placed into engagement with the work and the drill is operated in the usual manner, being advanced by means of the screw 6, or with certain kinds of work where it is desired to advance the drill by pressure on the breast plate 5 alone, the set screws 14 are released so that the drill-press is free to slide along the guide rods 11. This feature is particularly useful in connection with the tapping of screw threads. Where great accuracy is desired, the base plate may be clamped to the work by means of an ordinary hand clamp as illustrated in Fig. 1.

Although but one specific embodiment of this invention has been herein shown and described, it will be understood that numerous details of the construction shown may be altered or omitted without departing from the spirit of this invention as defined by the following claims.

I claim:

1. A drill-press support comprising a base, upright guide means rigidly mounted thereon, a cross-head adapted for supporting a drill-press and slidably mounted on said guide means, a second cross-head slidably mounted on said guide means, releasable means for securing said second cross-head in a fixed position on said guide means, and a feed screw coacting with said second cross-head.

2. The combination with a breast drill, of a support comprising a base plate having upright guide means mounted thereon, means for supporting the breast drill on said guide means, said base plate being parallel-sided, and a pair of work-engaging blocks slidably engaging the parallel sides of said base plate and relatively adjustable thereon, said blocks having V-shaped work-engaging faces for centering the work relative to the drill, and said base plate and blocks being adapted to permit the blocks to be shifted apart until they are disengaged from said base plate.

3. The combination with a breast drill, of a support comprising a base plate having upright guide means mounted thereon, means for slidably supporting the breast drill on said guide means, said base plate being parallel-sided, and a pair of work-engaging blocks slidably engaging the parallel sides of said base plate and relatively adjustable thereon, said blocks having V-shaped work-engaging seats in their opposed faces for centering the work relative to the drill.

4. The combination with a breast drill, of a support comprising a base plate having upright guide means mounted thereon, means for slidably supporting the breast drill on said guide means, said base plate being parallel-sided, and a pair of work-engaging blocks slidably engaging the parallel sides of said base plate and relatively adjustable thereon, said blocks having V-shaped work-engaging seats in their opposed faces and in their bottom edges for centering the work relative to the drill.

Signed at Chicago this 18th day of September, 1918.

LEOPOLD F. GLAUDE.